A. F. HOFFMAN.
PROCESS OF PRODUCING BY-PRODUCTS FROM WASTE PICKLE LIQUOR.
APPLICATION FILED APR. 8, 1916. RENEWED NOV. 10, 1917.
1,269,442.
Patented June 11, 1918.
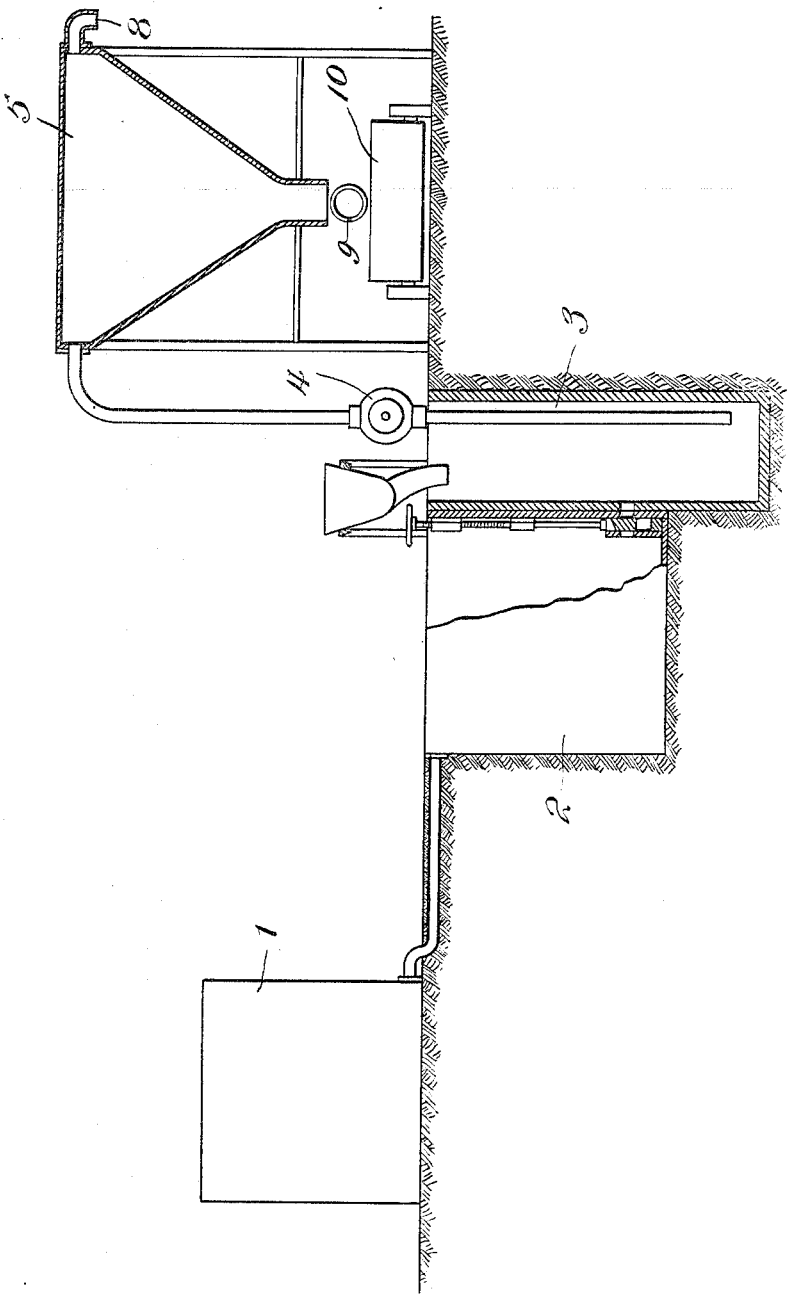
Witness
J. L. Wright
Inventor
Addison F. Hoffman
By Victor J. Evans
Attorney

UNITED STATES PATENT OFFICE.

ADDISON F. HOFFMAN, OF PITTSBURGH, PENNSYLVANIA.

PROCESS OF PRODUCING BY-PRODUCTS FROM WASTE PICKLE LIQUOR.

1,269,442.   Specification of Letters Patent.   Patented June 11, 1918.

Application filed April 8, 1916, Serial No. 89,886. Renewed November 10, 1917. Serial No. 201,401.

*To all whom it may concern:*

Be it known that I, ADDISON F. HOFFMAN, a citizen of the United States, residing at Pittsburgh, in the county of Allegheny and State of Pennsylvania, have invented new and useful Improvements in Process of Producing By-Products from Waste Pickle Liquor, of which the following is a specification.

The present invention relates to the recovery of by-products, particularly pigments and sulfuric or other acid from waste pickle liquor, and with the consequent elimination of serious disadvantages which have hitherto resulted from dumping these waste liquors into streams.

At present there are three pickling solutions in common use, for the pickling of iron articles, previous to tinning, galvanizing and the like, these solutions consisting respectively of sulfuric acid and water, hydrochloric acid and water, and sulfuric acid, sodium bisulfate and water. All three of these liquors contain more or less free acid when discharged from the pickling tanks, and also contain large quantities of iron salts. It is the usual practice to withdraw the pickling liquor from the pickling tanks when the action of the liquor on the iron articles slows down, to then add more or less strong acid thereto, to bring the pickle liquor up to normal strength of acid, and then to reuse the pickle liquor. This strengthening of the old liquors is repeated in practice several times, until the liquor becomes relatively concentrated in iron salts, after which it would not be advantageous to add further quantities of acid, since the presence of the large amounts of iron salts is detrimental in the pickling operation.

The present invention comprises the treatment of waste pickle liquors including and having particular reference to the concentrated solutions of iron salts, which cannot be profitably strengthened by addition of acid and reused in the pickling operation. The accompanying drawing shows diagrammatically a device for carrying out the process of my present invention.

1 shows a pickling tank of any desired construction, from which the pickle liquor, while still substantially boiling hot, flows through a pipe into a settling and clarifying tank 2, which is preferably placed underground, in order to economize space, and also in order to retain the heat in the liquor. The liquor is here allowed to settle and clarify, and while scrap iron may be added in this tank if desired, it is ordinarily not advisable to add scrap iron. In this tank all dissolved gases have a chance to escape from the liquor. The clarified liquor is then drawn into tank 3 by opening the valve connecting these two vessels, and in the tank 3 there is added to the liquor pulverized magnesite or pulverized dolomite, although for certain purposes pulverized limestone may be employed, but limestone is less advantageous as will appear farther on. A sufficient amount of this material being added to neutralize all free acid and to convert the soluble iron salts into hydroxids should preferably be added. The following reactions take place:

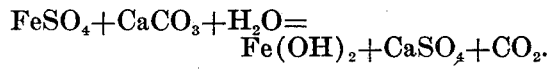
$$FeSO_4 + CaCO_3 + H_2O = Fe(OH)_2 + CaSO_4 + CO_2.$$

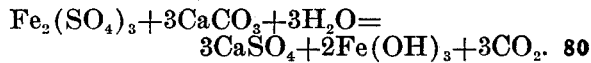
$$Fe_2(SO_4)_3 + 3CaCO_3 + 3H_2O = 3CaSO_4 + 2Fe(OH)_3 + 3CO_2.$$

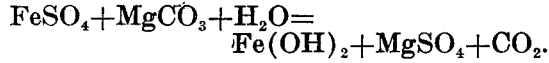
$$FeSO_4 + MgCO_3 + H_2O = Fe(OH)_2 + MgSO_4 + CO_2.$$

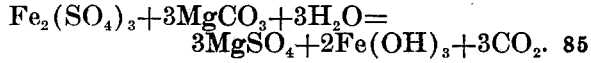
$$Fe_2(SO_4)_3 + 3MgCO_3 + 3H_2O = 3MgSO_4 + 2Fe(OH)_3 + 3CO_2.$$

The presence of magnesium carbonate in the alkaline material employed is a distinct advantage in producing a pigment, since the magnesium sulfate is readily soluble and does not appear in the precipitate. The solution of magnesium sulfate left after the removal of the precipitate may be concentrated and magnesium sulfate produced as a by-product. In some grades of magnesite and dolomite a considerable amount of magnesium silicate is found, which likewise reacts with the iron salts, although more slowly. In cases of waste pickle liquors from the hydrochloric acid pickling processes, the following are the typical reactions:

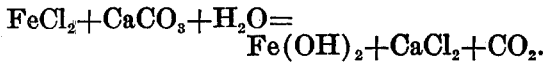
$$FeCl_2 + CaCO_3 + H_2O = Fe(OH)_2 + CaCl_2 + CO_2.$$

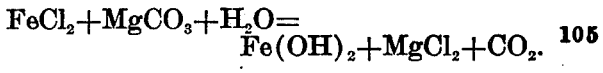
$$FeCl_2 + MgCO_3 + H_2O = Fe(OH)_2 + MgCl_2 + CO_2.$$

The sludge in tank 3 is then pumped up by the pump 4 into the tank 5, where the surplus liquid may be drawn off for further treatment. In the tank 5 the liquid may be heated to the boiling point and allowed to cool, in order to remove dissolved gases and to aid in the precipitation and separation of the precipitate from the liquor. The liquor and precipitate may if desired be passed through a centrifugal separator, or otherwise separated. The precipitate should be further dried and aerated at the end of this operation, for the production of a brown pigment or a gas purifying material, or other commercial product. This aerating step is of importance, since it converts whatever ferrous hydroxid there my be present, into ferric hydroxid. The vessel 5 is provided with an over-flow 8.

During the aeration of the precipitate the following reaction takes place:

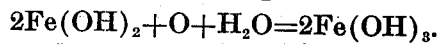

$$2Fe(OH)_2 + O + H_2O = 2Fe(OH)_3.$$

The precipitate is then calcined, for example in the rotary calciner 9, at a temperature of preferably about 300° C., at which temperature the water is completely driven off with the production of ferric oxid, the color of the product depending to some extent upon the time of burning, temperature of burning, quantity of foreign matter present, and other conditions. Accordingly, it is advisable to carefully regulate the temperature of the calcining operation.

During the calcining operation, the major portion of whatever calcium sulfate may be present is reduced, by the reducing flame used in the heating operation, to calcium sulfite or calcium sulfid, which materials may be readily leached out of the calcined product, by means of water containing small amounts of hydrochloric or sulfuric acid. This completely removes the calcium sulfate, thereby greatly improving the character of the pigment, and the dilute acid does not have any deleterious effect upon the pigment.

In some instances lime or preferably dolomitic lime may be employed in the place of the magnesite or dolomite or limestone, but without securing any added advantage, and in this case, care should be taken not to add any material excess of the lime, which would greatly injure the color of the pigment. Lime is further not to be recommended, on account of increased cost.

What I claim and desire to secure by Letters Patent is:

A process of treating waste pickle liquor which comprises settling the hot liquor, adding a calcareous neutralizing agent in amount capable of neutralizing all the free acid therein, without previously reducing the ferric salts contained therein, and a sufficient excess of such neutralizing agent to convert the soluble iron salts into hydroxids, said neutralizing agent containing compounds of magnesium capable of neutralizing acids, thoroughly agitating the mixture, and allowing the same to settle, separating the sludge from the liquid, drying and aerating the sludge, calcining the same under conditions capable of reducing at least a considerable proportion of the calcium sulfate content thereof, and leaching the calcined material with a liquid capable of removing the alkaline earth metal sulfur compounds therefrom.

In testimony whereof I affix my signature in presence of two witnesses.

ADDISON F. HOFFMAN.

Witnesses:
JENNIE JONES,
B. F. FUNK.